(12) United States Patent
Gottschald

(10) Patent No.: US 6,813,536 B1
(45) Date of Patent: Nov. 2, 2004

(54) METHOD AND DEVICE FOR COMPUTER NUMERICAL CONTROL OF MACHINING OF SPECTACLE LENSES

(75) Inventor: Lutz Gottschald, Meerbusch (DE)

(73) Assignee: Wernicke & Co. GmbH (DE)

( * ) Notice: Subject to any disclaimer, the term of this patent is extended or adjusted under 35 U.S.C. 154(b) by 0 days.

(21) Appl. No.: 09/601,693

(22) PCT Filed: Jan. 27, 1999

(86) PCT No.: PCT/EP99/00510

§ 371 (c)(1),
(2), (4) Date: Aug. 7, 2000

(87) PCT Pub. No.: WO99/39869

PCT Pub. Date: Aug. 12, 1999

(30) Foreign Application Priority Data

Feb. 5, 1998 (DE) .......................................... 198 04 542

(51) Int. Cl.⁷ ............................. G06F 19/00; B24B 1/00
(52) U.S. Cl. ........................ 700/160; 700/175; 451/42
(58) Field of Search .............................. 700/159–161, 700/164, 190–195, 173–176; 451/5, 6, 41–44; 351/177, 178

(56) References Cited

U.S. PATENT DOCUMENTS

| 4,656,590 A | * | 4/1987 | Ace ........................... 700/164 |
| 5,210,695 A | * | 5/1993 | Wood ......................... 700/164 |

(List continued on next page.)

FOREIGN PATENT DOCUMENTS

| DE | 3933906 | 2/1991 |
| DE | 4012660 | 10/1991 |
| DE | 4019866 | 1/1992 |
| DE | 4427071 | 2/1996 |
| DE | 3933906 | 10/1996 |
| EP | 0 196 114 A2 | 10/1986 |
| EP | 0 205 033 B1 | 12/1986 |
| EP | 0447084 | 9/1991 |
| EP | 0532892 | 3/1993 |
| EP | 0865871 | 9/1998 |
| EP | 0875340 | 11/1998 |
| EP | WO 99/39869 A1 | * 8/1999 |
| EP | WO 99/40494 A1 | * 8/1999 |
| GB | 2124943 | 2/1984 |
| JP | 3-166050 | 7/1991 |
| JP | 408290348 A | * 11/1996 |
| JP | 409254001 A | * 9/1997 |

OTHER PUBLICATIONS

Abstract of Derwent DE 44 27 701.
Abstract of Derwent DE 40 12 660.
Abstract of Derwent DE 39 33 906.
Abstract of Derwent DE 40 19 866.

Primary Examiner—Maria N. Von Buhr
(74) Attorney, Agent, or Firm—Ostrolenk, Faber, Gerb & Soffen, LLP

(57) ABSTRACT

The present invention relates to a method and a device for machining glass-lenses using a glass-lens machining apparatus with computerized numerical control. The method of the present invention comprises the following steps: introducing opto-metrical data relating to the glasses support into the computer of the apparatus control device which is provided with a host connection; introducing into the computer the data corresponding to the shape of a selected rim for glasses; introducing into the computer data about the material of the non-machined lens; calculating the required diameter of the glass-lens and displaying the result; introducing a non-machined lens into the apparatus; optionally calculating, e.g. in the host computer, the gradient of a bevel, groove or bezel on the shaped glass-lens according to the data introduced or to the front or back curves which are inherent to the existence of surfaces; and carrying out the computerized numerical-control machining of the non-machined lens.

30 Claims, 1 Drawing Sheet

U.S. PATENT DOCUMENTS

| | | | | |
|---|---|---|---|---|
| 5,255,199 A | * | 10/1993 | Barkman et al. | 700/175 |
| 5,485,399 A | | 1/1996 | Saigo et al. | 364/525 |
| 5,890,949 A | * | 4/1999 | Shibata | 451/5 |
| 5,908,348 A | * | 6/1999 | Gottschald | 451/5 |
| 5,926,247 A | * | 7/1999 | Kimura | 351/41 |
| 5,967,879 A | * | 10/1999 | Gottschald | 451/5 |
| 5,971,537 A | * | 10/1999 | Fukuma et al. | 351/44 |
| 6,168,505 B1 | * | 1/2001 | Gottschald | 451/43 |
| 6,250,989 B1 | * | 6/2001 | Mizuno | 451/5 |
| 6,332,827 B1 | * | 12/2001 | Gottschald et al. | 451/6 |
| 6,564,111 B1 | * | 5/2003 | Gottschald | 700/95 |

* cited by examiner

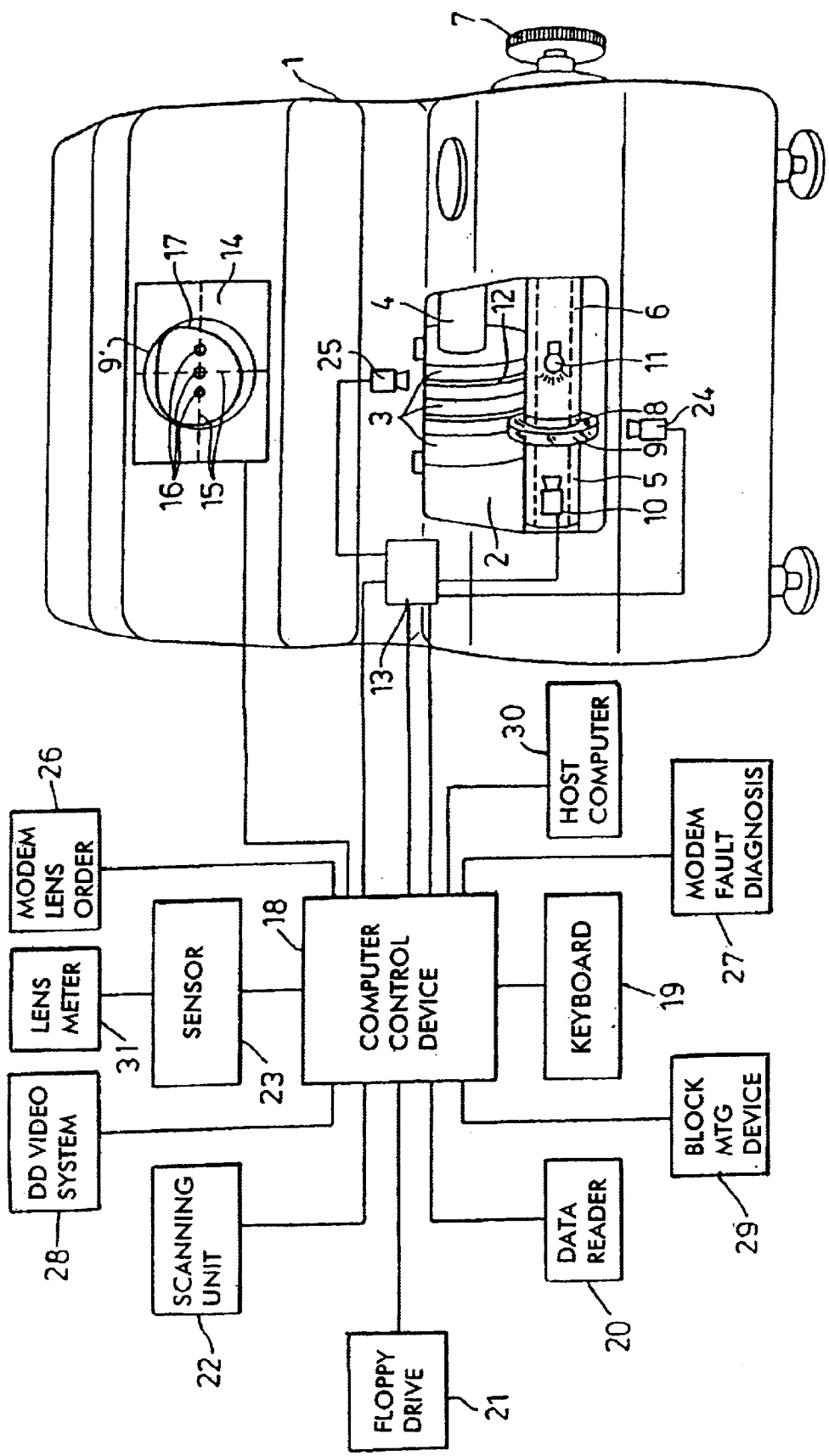

METHOD AND DEVICE FOR COMPUTER NUMERICAL CONTROL OF MACHINING OF SPECTACLE LENSES

BACKGROUND OF THE INVENTION

1. Field of the Invention

The invention relates to computer numerical control (CNC) of spectacle lens machining.

2. Relevant Art

Despite far-reaching automation, known CNC spectacle lens machining apparatuses, in particular spectacle lens edging machines, require a CNC-controlled particular accuracy, and therefore skill, for example in inserting into the apparatus a lens blank to be machined, and/or are demanding and complicated to operate as regards inputting the parameters required for the spectacle lens machining, which are a function of the optometric data of the spectacle wearer, the selected spectacle frame, the spectacle lens material and the like.

In the known CNC spectacle lens machining apparatuses, it stills happens that a finally machined spectacle lens cannot be inserted into the selected spectacle frame, and therefore has to be remachined.

The problem on which the invention is based is to create a method for machining spectacle lenses by means of a CNC spectacle lens edging machine, by means of which the operation of the CNC spectacle lens machining apparatus is simplified and made easier, and by means of which an increased accuracy is achieved for the shaped spectacle lens.

Furthermore, the invention is based on the problem of improving a CNC spectacle lens machining apparatus such that operation is substantially simplified in conjunction with increased machining accuracy.

BRIEF DESCRIPTION OF THE INVENTION

Starting from this formation of the problem, a method is disclosed for machining spectacle lenses by means of a CNC spectacle lens machining apparatus which comprises, according to the invention, the steps of:

inputting the optometric data of the spectacle wearer, that is to say dioptric number, values and angles of a cylindrical or prismatic cut, intensity and position of a reading portion, into a computer which cooperates with a control device of the apparatus, inputting the eye's viewing point or interpupillary distance (PD values) of the spectacle wearer into the computer by means of a selected spectacle frame, inputting the shape data of a selected spectacle frame, if appropriate of the profile, the shape and the circumference of a bevel groove of the spectacle frame or of a spectacle lens groove or a spectacle lens dubbed corner, corresponding to the spectacle frame, into the computer, inputting the spectacle lens material, that is to say silicate glass or plastic such as CR39 or polycarbonate, into the computer, calculating the required lens blank diameter in the computer and displaying the lens blank diameter, inserting a lens blank of the desired diameter into the apparatus, if appropriate, checking the position of the lens blank inserted into the apparatus, and incorporating the position of the lens blank by calculation in the machining data, if appropriate, calculating the profile of a bevel, a groove or a dubbed corner on the shaped spectacle lens from at least one of the following parameters: optometric data, PD values, shape data, radii of the front surface and rear surface and the center thickness of the spectacle lens, if appropriate, comparing the shape of the bevel groove in the selected spectacle frame with the shape of the bevel groove in a spectacle lens edging tool in the machine, and deciding by computation whether the machining of the bevel is or is not possible without or with taking account of correction values by computer, CNC machining of the lens blank, which comprises at least shaping the spectacle lens and, if appropriate, also machining a bevel, a spectacle lens groove or a spectacle lens dubbed corner, if appropriate also machining the optical surface(s), it being advantageous that it is possible for correction values to be incorporated by calculation into the machining data before the CNC machining of the lens blank as a function of prescribed machining tolerances, workpiece tolerances and tool tolerances and detected deviations thereof.

In addition to these steps, there can be performed on a screen a monitoring display of the input values and of the required lens blank diameter, and a positionally accurate imaging of the lens blank and, superimposed thereon, of the shape of the spectacle lens, such that all the parameters required for the spectacle lens machining can be checked visually.

When the bevel groove in the spectacle frame and the bevel resulting from the bevel groove in the spectacle lens edging tool are imaged and assigned on the circumference of the spectacle lens on a screen, it is further possible for the feasibility of the bevel machining to be checked visually.

In order to relieve the operator from particular attentiveness and care when inputting the parameters, inputting the dats required for spectacle lens machining can preferably be performed in machine-readable form, the required data can be stored at least partially on at least one data medium such as a magnetic strip card, bar code card or a floppy disk.

Again, the PD values need not be input alphanumerically into a keyboard when the PD values are determined by an automatic video recording system and the data determined are led directly into the computer of the control device. If the shape data of a selected spectacle frame are not available stored on a data medium, the shape data of a selected spectacle frame, including the bevel profile, the bevel shape and the circumference, can be determined in a contactless fashion in a scanning device and led directly to the computer.

When the dimensions and the shape of the bevel groove in the spectacle lens edging tool are determined in a preferably contactless fashion by a video recording system or laser scanner system, and these data are led directly to the computer, it is possible to use the computer to establish whether a bevel can be produced on a spectacle lens, which is to be shaped, in accordance with the dimensions and the shape of the bevel groove in the selected spectacle frame with the aid of the existing spectacle lens edging tool as a function of the wear of the bevel groove in the spectacle lens edging tool, if appropriate with incorporation of a correction value by calculation.

In order to calculate the bevel profile on the circumference of a spectacle lens which is to be shaped, either it is possible for the profile of the front edge and the rear edge of a spectacle lens, which is to be shaped, to be scanned in the apparatus, preferably in a contactless fashion by means of a video recording system, whereupon the data are led directly to the computer, which calculates therefrom the profile of a bevel suitable for the selected spectacle frame and uses these values to control the bevel machining; or the profile of the front edge and of the rear edge of a spectacle lens corresponding to a selected spectacle frame are calculated by the computer using at lease one of the parameters of: optometric data, PD values, shape data, radii of the front surface and rear surface and the center thickness, which calculates therefrom the profile of a bevel suitable for the selected spectacle frame and uses these data to control the bevel machining, the profile of the front edge and of the rear edge can preferably be calculated from the radii of the front surface and rear surface along with the center thickness, and/or can be taken over from a computer for the surface machining. This computer for surface machining can be the same computer as for the edge machining.

The input and calculated data can be conveyed to a spectacle lens manufacturer as order data for the lens blank by long-distance data transmission, such that after the ordered lens blank has arrived, it is possible to perform the final machining of the lens blank in a spectacle lens machining apparatus attached to the computer.

It is also possible for the input and calculated data to be conveyed to a spectacle lens manufacturer as order data for a finally machined spectacle lens by means of long-distance data transmission, such that after the arrival of the finally machined spectacle lens all that is required is for the optician to insert the spectacle lenses into a selected spectacle frame.

All the calculations for determining the machining data can be performed by a host computer which, as an external control unit, controls a plurality of machines and units in multitasking mode.

The solution of the problem mentioned at the beginning is also served by a spectacle lens machining apparatus, having a housing, a machining chamber in the housing, a spectacle lens holding shaft and a machining device in the chamber, a computer connected to a control device for controlling the machining of a lens blank, held by the spectacle lens holding shaft, by means of the machining device, an input keyboard connected to the computer, and a data reading device, which can be connected to the control device, for data for the spectacle lens machining which are stored on a data medium card, such as a magnetic strip card, bar code card or the like.

Moreover, it is possible for there to be present a floppy disk drive, connected to the computer, for data, stored on a floppy disk, for the spectacle lens machining, and/or a scanning device, connected to the computer, for the spectacle lens opening in a selected spectacle frame as well as for the profile, the cross-sectional shape and the circumference of a bevel groove in the spectacle frame, and/or a sensor, connected to the computer, for detecting characterizing markings on a lens blank, on packaging for a lens blank or a storage container for lens blanks and/or on a spectacle frame, packaging for a spectacle frame or on a storage container for a spectacle frame, and/or a video recording system, which can be connected to the control device, for automatically recording the PD values of the spectacle wearer with reference to a selected spectacle frame, and/or a vertex retractionmeter, connected to the computer, for automatically recording the optical values of a shaped spectacle lens or a lens blank, and/or a device, connected to the computer, for mounting a block or sucker on a lens blank or a shaped spectacle lens, and for automatically transmitting the position of the block or sucker on the lens blank or the shaped spectacle lens to the computer, the result being that it is superfluous for an operator to make alphanumeric inputs into the apparatus.

No particular requirements are made of the accuracy with which the lens blank is inserted into the spectacle lens holding shaft when a detection device, connected to the computer, is present for the position of a lens to be machined with reference to the spectacle lens holding shaft, since the position of the lens blank detected by the detection device with reference to the spectacle lens holding shaft can be taken into account computationally when machining the lens blank.

It is likewise possible to provide a detection device, connected to the computer, for the diameter of a lens blank, held in the spectacle lens holding shaft and/or for the profile of the front edge and the rear edge of the circumference of a shaped spectacle lens, the data of which can be used by the computer to calculate the bevel profile on the circumference of the shaped spectacle lens and to control the machining thereof.

When, furthermore, a detection device, connected to the computer, for the shape and the dimensions of a bevel groove in a spectacle lens edging tool is present, the bevel groove in the spectacle lens edging tool can be compared with the bevel groove in the selected frame, and a decision can be made as to whether or not a spectacle lens with the calculated bevel can be inserted into the selected spectacle frame, if appropriate with incorporation of correction values by calculation as a function of the shape and the dimensions of the bevel groove in the selected spectacle frame and in the spectacle lens edging tool.

The detection devices for the position of a lens which is to be machined with reference to the spectacle lens holding shaft, for the diameter of a lens blank held in the spectacle lens holding shaft and/or for the profile of the front edge and the rear edge of the circumference of a shaped spectacle lens, and the detection device for the shape and the dimensions of a bevel groove in a spectacle lens edging tool can preferably comprise a charge coupled device or CCD camera or a laser scanner system, it being possible for the detection device for the diameter of a lens blank held in the spectacle lens holding shaft and/or for the profile of the front edge and the rear edge of the circumference of a shaped spectacle lens, and the detection device for the shape and the dimensions of a bevel groove in a spectacle lens edging tool, to be implemented as separate devices or in a fashion combined from a single device.

A screen, connected to the computer, for displaying the input date and/or for imaging the lens blank with the required diameter and/or the spectacle lens, which is aligned in the correct position with reference to the lens blank and is to be shaped, and/or the bevel groove cross section of a selected spectacle frame, as well as the bevel, resulting from the dimensions and the shape of the bevel groove of the spectacle lens edging tool, of a spectacle lens to be shaped facilitates the visual monitoring by the operator with regard to the data which have been input or read in, and with regard to the finished spectacle lens, but is not mandatory for the automatic running of the spectacle lens machining.

When all inputs are performed by means of automatic data reading units or scanning devices in the way outlined above, the spectacle lens edging machine according to the invention need have only a very simple input keyboard, which comprises only a switch-on key, a start key, an interruption key for the running machining operation, a stop key and, if appropriate, a key for controlling an aftercut.

BRIEF DESCRIPTION OF THE DRAWING

The invention is explained in more detail below with the aid of an exemplary embodiment illustrated in the single FIGURE of drawing.

DETAILED DESCRIPTION OF THE INVENTION

Of a CNC spectacle lens edging machine which is known per se, the FIGURE illustrates a housing 1 in whose grinding chamber 2 three grinding wheels 3 are arranged on a shaft 4. One of the grinding wheels with a cylindrical surface serves for pregrinding the outline of a spectacle lens, while the two further grinding wheels serve for incipiently grinding different top bevels on the preground spectacle lens. One of the bevel grooves is denoted by the reference numeral 12. Arranged parallel to the shaft 4 with the grinding wheels 3 are coaxial, rotatable, hollow half-shafts 5, 6 of which the half-shaft 6 is axially displaceable. The half-shafts 5, 6 have on their ends annular holding heads 8 between which a lens blank 9 can be clamped. The clamping can be performed automatically or via a handle 7. The lens blank 9 can be swung into the region of the half-shafts 5, 6 by firstly being mounted by hand on a holder (not illustrated) on a flap (likewise not illustrated) which outwardly seals the grinding chamber 2 and, for example, is held on the holder by means of a controllable suction device which acts outside the region of the surface required for holding the lens blank 9 between the half-shafts 5, 6. Such a device is described in detail in DE 195 37 692 C2 of the same applicant.

An illuminating device 11 is arranged in the hollow half-shaft 6, while a detection device in the form of a CCD camera is arranged coaxially therewith in the hollow half-shaft 5. This CCD camera is capable of picking up conventional markings, for example a three-point marking 16, illustrated on a screen 14 of the spectacle lens edging machine, on the lens blank 9, and converting them into electric signals. The middle point of the three-point marking 16 denotes the optical midpoint of the lens blank 9, while the outer points yield the axial position of a cylindrical or prismatic cut.

The signals generated by the CCD camera 10 pass into a transformer 13 and are converted there into signals which can be evaluated by calculation by a computer of a control device 18, such that the image 9', picked up by the CCD camera 10, of the lens blank 9 with the markings 16 can be represented on the screen 14 in a fashion positioned accurately with reference to an axis intersection 15.

Accurate positioning of the lens blank 9 is not required, since the values picked up by the CCD camera 10 are input via the converter 13 into the computer of the control device 18 and are taken into account there by calculation when imaging on the screen 14 and during the CNC grinding of the spectacle lens. The lens blank 9 can therefore be mounted by hand on the holder on the cover, without particular requirements on the accuracy and skill of the operator, and swung between the half-shafts 5, 6, since the position of the optical midpoint and the axial position of a cylindrical or prismatic cut are picked up by the CCD camera 10 and taken into account by calculation in the computer of the control device 18. The device for detecting the position of the optical midpoint and the axial position of a cylindrical or prismatic cut on a lens blank 9 between the half-shafts 5, 6 is described in detail in DE 19 52 722 C2 of the same applicant.

The image 9' of the lens blank 9 on the screen 14 is superimposed in a positionally accurate fashion by an image 17 of the spectacle lens, which is to be form-ground, i.e., edge ground to a specific peripheral shape corresponding to a selected spectacle frame opening, including a possibly required top bevel, such that it is possible when viewing the image 9' of the lens blank 9 and the superimposed image 17 of the spectacle lens to establish whether the lens blank diameter is sufficient for form grinding of the spectacle lens.

The optometric data of the spectacle wearer, the PD values of the spectacle wearer, the material of the spectacle lens, for example silicate glass or plastic such as CR39, polycarbonate and/or the lens curve data, specifically the radii $R_1$, $R_2$ of the optical front surface and the optical rear surface, the center thickness of the lens and the roughcast lens diameter can be input, and the type of bevel to be provided, for example a kaiser bevel, 30% bevel and an image, taken by means of a CCD camera 25, of the bevel groove 12 in one of the grinding wheels 3 can be imaged on the screen 14 in a fashion controlled by the computer of the control device 18 and, furthermore, in alphanumeric form.

A further CCD camera 24 is arranged in the region of the lens blank 9 clamped between the half-shafts 5, 6. This CCD camera 24 serves the purpose of picking up the lens blank diameter and the profile of the front curve and rear curve on the form-ground spectacle lens as a function of the angle of rotation of the half-shafts 5, 6, and of leading them to the control device 18 via the converter 13. Given a suitable arrangement, the CCD cameras 24, 25 can also be combined to form a single CCD camera which optically scans both the lens blank 9 or the form-ground spectacle lens and the bevel groove 12.

It is also possible to use laser scanner systems instead of the CCD cameras 10, 24, 25.

Connected to the computer of the control device 18 are an input keyboard 19, a data reading device 20 for reading in data on data media in the form of a card with a magnetic strip, a bar code or a floppy disk drive 21 for reading into the control device 18 data stored on floppy disks, a scanning unit 22 for scanning a spectacle lens opening in a spectacle frame or a pattern disk, and a sensor 23 for reading into the control device 18 data recorded on a spectacle lens, a bag for a spectacle lens, on a case with spectacle lens, for example in the form of a bar code, or for reading data arranged on a spectacle frame in the form of a bar code into the control device 18. Furthermore, it is also possible for there to be connected to the computer of the control device 18 a vertex refractionmeter 31 which can be used to determine the optometric data of a given spectacle lens automatically and input them into the computer of the control device 18.

The computer of the control device 18, which preferably comprises a personal computer (PC), constitutes the command center and the operations planning and scheduling, for an order to be carried out by the optician. All the data are stored, processed and passed on and called up in the computer of the control device. The optometric data of the spectacle wearer, that is to say the dioptric number of the spectacle lens, the refracting powers of a cylindrical or prismatic cut as well as the axial position thereof and the corresponding optometric values of a reading portion are input into the computer of the control device 18 either alphanumerically via the input keyboard 19 or by reading off from a customer card or sickness insurance plan card by means of the data reading device 20, inputting a floppy disk into the floppy disk drive 21, or else by measuring an existing spectacle lens of the spectacle wearer by means of vertex refractionmeter 31.

Inputting via a data reading device 20, a floppy disk drive 21 or vertex refractionometer 31 is preferred, since the input keyboard 19 can in this case be of particularly simple configuration, and there is a need to use only at most five keys, a key for switching on, a key for inputting the start signal, a key for controlling an aftercut, a key for aborting or interrupting a grinding operation, and a stop key. Again, the shape data of the spectacle lens opening of a selected spectacle frame can be input into the control device 18 via the data reading device 20 or the floppy disk drive 21 when these data are present in a form stored on a card or a floppy disk, for example supplied by the spectacle frame manufacturer together with the spectacle frame.

If this is not the case, the spectacle frame opening of a selected spectacle frame can be scanned by means of a scanning device 22. This scanning can preferably be carried out in a contactless fashion, for example by means of a video scanning system such as is described in DE 40 19 866 A1 of the same applicant. This video scanning system can be used to pick up the spectacle lens opening, including the profile of the bevel groove in a three-dimensional fashion including the cross-sectional shape, and to input them into the computer of the control device 18.

The pupil distance and the position of the pupils with reference to a selected spectacle frame (PD values) can be determined either in the usual way by the optician and input alphanumerically into the computer of the control device 18 via the keyboard 19, or the PD values are picked up by means of a video system 28 from the spectacle wearer with the aid of a mounted, selected spectacle frame, and evaluated and fed directly to the computer of the control device 18. Such a video system is known under the name of "Video-Infral" from Rodenstock AG.

Although, as described above, the lens blank 9 is preferably swung-in between the half-shafts 5, 6 without the use of a block, it is also possible to provide a lens blank 9 in the block device 29 with a block which is arranged at the optical midpoint and can be used to insert the lens blank between the half-shafts 5, 6 in an accurately positioned fashion without the need for renewed checking of the position of the optical midpoint with reference to the axis of rotation of the half-shafts 5, 6. In this case, the block device 29 can be configured as described in DE 42 33 400 C2 of the same applicant and connected to the computer of the control device 18, and this block device can also control the imaging of the image 9' of the lens blank 9 and of the spectacle lens 17 on the screen 14 via the computer of the control device 18.

Using the optometric data input into the computer of the control device 18, the spectacle frame data, the PD values and the further customer data, the computer of the control device 18 can calculate a lens blank with regard to the required diameter, the radii $R_1$, $R_2$ of the optical front surface and rear surface, and the optical center thickness as a function of the type of the spectacle lens material, that is to say plastic or silicate glass, and feed them via a modem 26 to a spectacle lens manufacturer for the purpose of ordering lenses.

The lens curve data $R_1$ and $R_2$ and the center thickness can also be input into the computer of the control device 18 by means of the input keyboard 19, or by means of a bar code on the lens blank itself or on a lens blank container. The computer of the control device 18 uses the input data to calculate the shape data for form grinding the lens blank 19 in accordance with the shape of the spectacle lens, which is yielded by the selected spectacle frame, and thereby controls the form grinding by means of the grinding wheels 3.

In order to grind the bevel, the computer of the control device 18 uses the spectacle frame data and the lens blank data to calculate a bevel profile, which can, for example, correspond exactly to the profile and the circumference of the bevel groove in the selected spectacle frame. It is likewise possible to specify a bevel profile, for example a 30% bevel, and the computer in the control device 18 checks whether this prescribed bevel profile is possible with the prescribed lens blank, and corresponds with reference to its circumference to the circumference of the bevel groove in the selected spectacle frame. If this is not the case, the computer in the control device 18 carries out a correction, for example by displacing the bevel profile, after which the bevel cut is carried out.

It is also possible to use the CCD camera 24 to measure the space curve of the front edge and the rear edge of the form-ground spectacle lens in three dimensions, and to lead them to the control device 18 via the converter 13. The computer in the control device 18 can use these data to calculate a bevel profile which is, for example, formed from the mean value of the profile of the front edge and the rear edge of the form-ground spectacle lens, or is at a constant distance from the front edge.

Instead of the CCD camera 24, it is also possible to provide a mechanical scanning system for the profile of the front edge and the rear edge of the form-ground spectacle lens, and for the contour of the form-ground spectacle lens, to which there are connected appropriate converters for generating electric signals which can be picked up and processed by the control device 18. Such electromechanical scanning devices for the profile for the front edge and the rear edge of the form-ground spectacle lens and of the contour of a form-ground spectacle lens having desired/actual value comparison are described in DE 42 08 835 C2 and DE 43 20 934 C2 of the same applicant. The profile of the front edge and the rear edge can also be calculated from the radii of the front surface and rear surface and the center thickness, and/or be taken over from a computer for surface machining. This computer for surface machining can be the same computer as for the edge machining.

The bevel groove 12 picked up by the CCD camera 25 is compared in the computer of the control device 18 with the image of the bevel groove picked up by means of the spectacle frame scanning device 22. It is possible by means of this comparison for the computer of the control device 18 either to give the control command to grind the bevel on the spectacle lens when the bevel grooves correspond, or the correct the grinding of the bevel when the deviation between the bevel groove 12 in the grinding wheel and the bevel groove in the spectacle frame does not exceed a prescribeable value, or to abort the grinding operation when the deviation is outside the prescribed tolerance.

It is also possible to connect to the computer of the control unit 18 a host computer 30 which then undertakes the calculations externally and can control a plurality of machines and units in multitasking mode.

The method according to the invention and the device for machining spectacle lenses can therefore be used firstly to scan a selected spectacle frame in a contactless fashion with the aid of image evaluation, the values $r=f(\gamma)$ and $z=f(\gamma)$, and the circumference U being detected, in which case r is the radius of the spectacle frame opening as a function of the angle $\gamma$, z is the coordinate in a direction perpendicular to the plane of the spectacle frame, and U is the circumference of the bevel groove. In addition, the shape of the bevel groove is also determined as a function of $\gamma$ and compared with the contactless measurement of the bevel groove in the grinding tool. The aim is to determine correction values during grinding in advance, even if the bevel groove of the grinding tool does not correspond to the bevel groove of the spectacle frame.

Moreover, the lens blank is measured, including the circumferences in accordance with its markings in a contactless fashion, and ground, preferably without a block, in the apparatus by using the computer to assign the frame shape to the position of the lens blank between the half-shafts 5, 6, including prescribed decentration (PD) values.

After the measurement of the position, the shape and the marking by means of a device permanently assigned to the apparatus, which can also be arranged in the apparatus itself, the spectacle lens no longer needs to be picked up by hand since, furthermore, the profile of the space curve of the front edge $z_1=f(\gamma)$ and the rear curve $z_2=f(g)$ is measured in a contactless fashion in the apparatus, and the profile of the bevel curve is determined in the computer and used to control the grinding operation.

Consequently, after insertion of the lens blank up to the finishing of the form-ground spectacle lens provided with a bevel, the spectacle lens is no longer taken out of the apparatus, with the result that no deviations can accumulate from step to step.

If, by contrast, faults should occur during machining of spectacle lenses, it is possible to use a modem 27 to make contact with the manufacturer of the apparatus, who is able in this way to use a test program to test the computer of the control device 18, with all connected input devices, and the spectacle lens edging machine, and to create a fault diagnosis which is conveyed back to the optician and provides him with information on the screen 14 as to how the faults can be remedied, and/or whether the apparatus needs to be repaired.

Although the present invention has been described in relation to particular embodiments thereof, many other variations and modifications and other uses will become apparent to those skilled in the art. It is intended therefore, that the present invention not be limited by the specific disclosure herein, but to be given the full scope permitted by the appended claims.

What is claimed is:

1. A method of computer numerically controlled (CNC) spectacle lens machining comprising the steps of:
    inputting optometric data of a spectacle wearer, including diopter number, values and angles of a cylindrical or prismatic cut, and power and position of a near portion, to a computer associated with a control unit of a lens machining apparatus;
    inputting an interpupillary distance (PD) value to the computer corresponding to a selected spectacle frame;
    inputting data to the computer representing the shape of the selected spectacle frame, and the curvature, shape, and periphery of a bezel of the selected spectacle frame
    inputting data to the computer identifying the material of a selected spectacle lens;
    computing a required lens blank diameter from the inputted data;
    visually displaying the lens blank diameter;
    inserting a lens blank of the required diameter into the lens machining apparatus;
    computing the curvature of a bevel on the spectacle lens to be machined from one or more of the optometric data, PD values, shape data, radii of the front or back surface, and center thickness of the spectacle lens;
    generating CNC machining data based on the computed curvature;
    comparing data characterizing the bezel of the selected spectacle frame with data characterizing a portion of a spectacle edge cutting tool in the machining apparatus and determining from the comparison if machining of a required bevel is possible, and if so, if any correction to the CNC machining data is required;
    if correction of the CNC machining data is required to permit machining of the bevel, determining required correction values for the machining data as a function of predetermined machining, workpiece and tool tolerances, and established deviations, and incorporating the correction values in the machining data;
    CNC machining of the lens blank according to the machining data with any incorporated correction values to form the peripheral shape and bevel of the lens.

2. A method in accordance with claim 1, further including the step of machining one or both optical surfaces of the lens blank.

3. A method in accordance with claim 1, further including the steps of:
    computing the curvature of the front edge and the rear edge of a spectacle lens shape by the computer for a selected spectacle frame from one or more of the optometric data, PD values, shape data, radii of the front and back surface, and center thickness;
    calculating the curvature of a bevel suitable for the selected spectacle frame from the computed front and rear edge curvature; and
    controlling the bevel machining based on the calculated bevel curvature.

4. A method in accordance with claim 1, further including the steps of:
    checking the position of the lens black inserted in the machine; and
    employing of the position of the lens blank in generating the machining data.

5. A method in accordance with claim 4, further including the steps of displaying the inputted values, the required lens blank diameter, and a positionally correct image of the lens blank with the spectacle lens shape superimposed thereon on a display device.

6. A method in accordance with claim 1, in which the bezel in the spectacle frame and the bevel on the periphery of the spectacle lens resulting from the bezel in the spectacle lens machining tool are imaged and associated on a display device.

7. A method in accordance with claim 1, in which the data required for the spectacle lens machining is inputted in machine-readable form.

8. A method in accordance with claim 7, in which the required data is at least partially stored on at least one data storage medium.

9. A method in accordance with claim 1, in which the PD values are determined by an automatic video recording system, and the resulting data are transmitted to a computer.

10. A method in accordance with claim 1, in which the shape data of a selected spectacle frame, including the bezel curvature, the bezel shape, and the periphery are determined without contact in a scanning device and transmitted to the computer.

11. A method in accordance with claim 1, in which the dimensions and the shape of the bezel in the spectacle edge machining tool are determined without contact by a video recording system or laser scanner system, and the resulting data are transmitted to the computer.

12. A method in accordance with claim 1, in which the curvature of the front edge and the rear edge is computed from the radii of the front and back surfaces and the center thickness and/or is obtained from a computer which controls surface machining of the lens.

13. A method in accordance with claim 1, in which the inputted and computed data are transmitted by telecommunication to a spectacle lens manufacturer as data for ordering a lens blank.

14. A method in accordance with claim 13, in which the ordered and received lens blank is finish-machined in a spectacle lens machining machine connected to the control unit.

15. A method in accordance with claim 1, in which the inputted and computed data are transmitted by telecommunication to a spectacle lens manufacturer at a remote location as data for ordering a finish-machined spectacle lens.

16. A spectacle lens machining apparatus comprising:
   a housing;
   a machining chamber in the housing including therein a spectacle lens holding shaft and an installed edge machining tool;
   a computer-operated control device for controlling the machining by the edge machining tool of a lens blank held by the spectacle lens holding shaft;
   an input keyboard connected to the computer,
   a data reading device connected to the computer for reading spectacle lens machining data stored on a data storage medium, and/or a scanning unit connected to the computer for scanning the spectacle lens opening in a selected spectacle frame and the curvature, cross-sectional shape, and periphery of a bezel in the spectacle frame, and
   a recognition device connected to the computer and operative to recognize the shape and dimensions of a bezel in the installed spectacle lens edge machining tool,
   the computer being operative to:
      generate CNC machining data;
      compare data characterizing the shape of the bezel in the selected spectacle frame with data characterizing a portion of the shape of the edge machining tool;
      determine from the comparison if machining of a required bevel is possible with the edge machining tool, and if so, if any correction to the CNC machining data is required;
      if correction of the CNC machining data is required to permit machining of the bevel, determine required correction values for the machining data as a function of predetermined machining, workpiece and tool tolerances, and established deviations, and incorporate the correction values in the machining data; and
      operate the control device to machine the lens blank according to the machining data including any required correction values to form the peripheral shape and bevel for the lens.

17. A spectacle lens machining apparatus in accordance with claim 16, further including a disk drive connected to the computer, and operative to read spectacle lens machining data stored on a floppy disk.

18. A spectacle lens machining apparatus in accordance with claim 16, further including a sensor connected to the computer operative to recognize characterizing identification markings associated with a lens blank, and/or a spectacle frame.

19. A spectacle lens machining apparatus in accordance with claim 18, wherein the sensor is operative to read the characterizing identification markings from a lens blank, from a package for a lens blank, or from a storage container for a plurality of lens blanks.

20. A spectacle lens machining apparatus in accordance with claim 18, wherein the sensor is operative to read the characterizing identification markings from a spectacle frame, a package for a spectacle frame, or a storage container for a plurality of spectacle frames.

21. A spectacle lens machining apparatus in accordance with claim 16, further including a video recording system connected to the computer which is operative to automatically record the PD values of a spectacle wearer from inspection of a selected spectacle frame.

22. A spectacle lens machining apparatus in accordance with claim 16, further including a lens meter connected to the computer which is operative to automatically record the optical values of a peripherally shaped spectacle lens or of a lens blank.

23. A spectacle lens machining apparatus in accordance with claim 16, further including a device connected to the computer which is operative to attach a block or suction device to a lens blank or on a peripherally shaped spectacle lens, and to automatically transmit the position of the attached block or suction device to the computer.

24. A spectacle lens machining apparatus in accordance with claim 16, further including a recognition device connected to the computer which is operative to recognize the position of a lens blank to be machined with respect to the spectacle lens holding shaft.

25. A spectacle lens machining apparatus in accordance with claim 24, wherein the recognition device is a CCD camera.

26. A spectacle lens machining apparatus in accordance with claim 16, further including a recognition device which is operative to determine the diameter of a lens blank held in the spectacle lens holding shaft and/or the curvature of the front edge and rear edge of the periphery of a periphery shaped spectacle lens.

27. A spectacle lens machining apparatus in accordance with claim 26, wherein the recognition device is a CCD camera.

28. A spectacle lens machining apparatus in accordance with claim 16, further including a display device connected to the computer, and wherein the computer is operable to display one or more of:
   the inputted data;
   an image of the lens blank having the required diameter for a spectacle lens or a desired peripheral shape;
   a spectacle lens having a desired peripheral shape which has the positionally correct alignment with respect to the lens blank,
   the bezel cross section of a selected spectacle frame, and of the bevel of a spectacle lens having a desired peripheral shape to be machined, which (bevel) results from the dimensions and the shape of the bezel of an installed edge machining tool.

29. A spectacle lens machining apparatus in accordance with claim 16, further including an input keyboard, which has only an on/off key, a start key, a key for interrupting a machining operation in progress, and a stop key.

30. A spectacle lens machining apparatus in accordance with claim 16, further including an input keyboard, which has only an on/off key, a start key, a key for interrupting a machining operation in progress, a stop key, and a key for controlling a regrinding operation.

* * * * *